March 17, 1959 H. A. VAN MEURS ET AL 2,877,805
METHOD OF MANUFACTURING A CAGE-LIKE GRID MEMBER ADAPTED
FOR USE IN AN ELECTRIC DISCHARGE DEVICE
Filed March 26, 1956 2 Sheets-Sheet 1
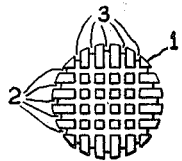
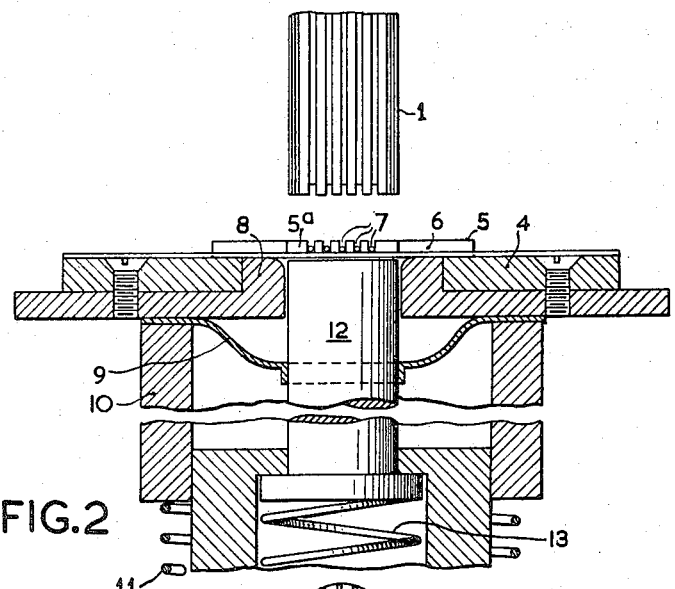
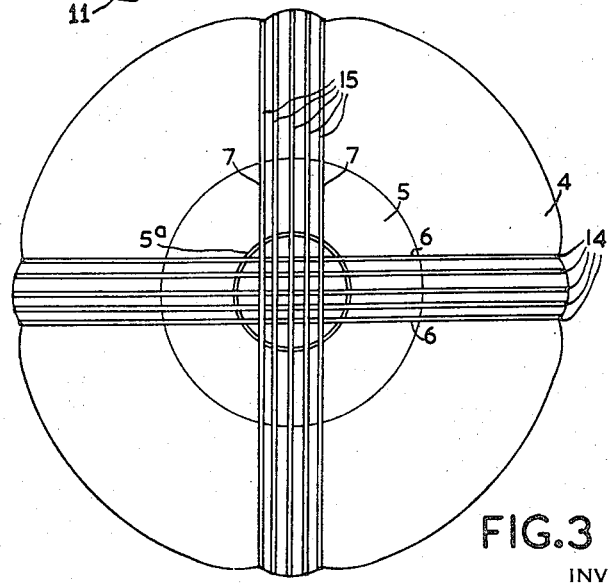
INVENTOR
HUBERTUS ANTHONIUS VAN MEURS
CORNELIUS OTTO JONKERS
BY
AGENT March 17, 1959 H. A. VAN MEURS ET AL 2,877,805
METHOD OF MANUFACTURING A CAGE-LIKE GRID MEMBER ADAPTED
FOR USE IN AN ELECTRIC DISCHARGE DEVICE
Filed March 26, 1956 2 Sheets-Sheet 2

INVENTOR
HUBERTUS ANTHONIUS VAN MEURS
CORNELIUS OTTO JONKERS
BY
AGENT

United States Patent Office 2,877,805
Patented Mar. 17, 1959

2,877,805

METHOD OF MANUFACTURING A CAGE-LIKE GRID MEMBER ADAPTED FOR USE IN AN ELECTRIC DISCHARGE DEVICE

Hubertus Anthonius van Meurs, Massapequa, N. Y., and Cornelius Otto Jonkers, Eindhoven, Netherlands, assignors, by mesne assignments, to North American Philips Company, Inc., New York, N. Y., a corporation of Delaware Application March 26, 1956, Serial No. 574,001

Claims priority, application Netherlands April 6, 1955

3 Claims. (Cl. 140—71.5)

The invention relates to a method of manufacturing cage-shaped grids for use in electric discharge tubes, more particularly transmitter tubes, and to apparatus for such manufacture.

Such a cage-grid comprises a supporting member shaped in the form of a more or less flexible, annular disc, in the opening of which is secured a plurality of U-shaped wires. These wires constitute a unilaterally closed cage and at the closed end of the cage the wires are arranged crosswise.

The manufacture of these grids is not simple, since it must be performed manually for the greater part.

In accordance with the invention, a very suitable method of manufacturing such cage-shaped grids is obtained, by arranging two groups of parallel, straight wires, cut to size, crosswise in grooves of a matrix shaped in the form of an annular disc, the supporting member or support for the wires being clamped against the opposite end of the matrix in a manner such that the openings of the matrix and of the support are coaxial and opposite one another. A counter-die is next introduced through these openings up to the wires or in the proximity thereof, after which a die urges the crossed wires against the counter-die, the latter, together with the former, being urged through the opening of the matrix and then through the opening of the support until the ends of the U-shaped wires arrive approximately at the level of the inner edge of the support opening, to which they are finally secured, preferably by welding: to this end the die may serve at the same time as a welding electrode.

The invention will be described more fully with reference to a drawing, in which—

Fig. 1 is a bottom view of a die and

Fig. 2 is a side view of the apparatus showing a matrix with a die and a counter-die.

Fig. 3 is a plan view of the matrix shown in Fig. 2.

Figure 4:
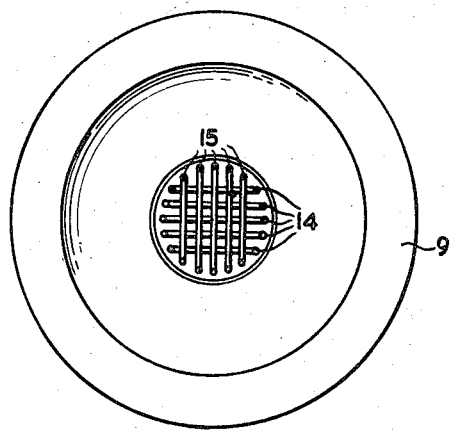
Figs. 4 and 5 are a plan view and a longitudinal sectional view respectively of a grid manufactured by means of the apparatus shown in Figs. 1 and 2.

Referring to Fig. 1, reference numeral 1 designates the die, at the outer cylindrical surface of which a plurality of rectangular, parallel grooves 2 and 3 are provided, these grooves being at right angles to one another at the end surface of the die 1.

The apparatus shown in Fig. 2 is constituted by wire supporting and positioning means, such as a ring 4 having an annular, disc-like part 5, in which grooves 6 and 7 are provided. The part 5 has a central opening 5a. The ring 4 is secured to a steel matrix or support 8, the opening of which slightly exceeds that of the part 5. The grooves 6 and 7 open out into the opening 5a of the part 5.

At the bottom of the matrix 8 provision is made of a grid supporting member or ring 9, which is clamped inside a cylinder 10 and against the matrix 8 by means of a spring 11. In the grooves 6 and 7 are arranged two groups of parallel, straight wires 14 and 15 of the desired length, the wires 14 being arranged in the grooves 6 and the wires 15 in the grooves 7. The wires thus cross one another over the opening 5a of the matrix. A counter-die or guide means 12 is urged upwards by a spring 13 into the proximity of the wires 6 and thus centers the grid support 9 relative to the matrix 8. The openings of the ring 9 and of the matrix 8 are thus coaxial to one another. The entire assembly is supported at the bottom.

The die 1 is then moved downwards through the matrix 8 to an extent such that the wires 14 and 15 are curved in the form of a U and are slipped through the openings of the matrix and the support 9 until the ends of the wires 14 and 15 lie approximately at the level of the inner edge of the grid support opening 9. If the lengths of all wire portions outside the matrix opening are equal, the ends will finally lie on the same level in the ring opening. This is ensured, when the periphery of the matrix ring 4 has the same radius of curvature at the ends of the grooves 6 and 7 as that of the opening in the center of the part 5.

Figure 5:
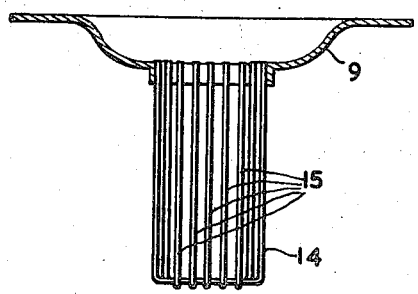

With the die and the matrix associated therewith, the grid is then removed from the cylinder 10 and the counter-die 12, after which the ends of the grid wires are secured by welding in the support 9. The die may serve in this case as a welding electrode. Then the grid has the shape shown in Figs. 4 and 5.

Instead of arranging a plurality of wires cut to length in the grooves 6 and 7, the wires may be wound from a corresponding number of reels and drawn into the grooves and cut to the desired length just before the die is moved downwards, for example by means of a cutting die, which cuts off the wires at the edge of the ring 4. It is furthermore important that the center lines of the sections of all grooves 2 in the die 1 should be parallel, as well as that of all grooves 3, since otherwise a regularly shaped grid cage cannot be obtained.

The depth of the grooves 2 and 3 in the cylindrical outer surface of the die 1 is slightly smaller than the thickness of the grid wires.

The crossed wire portions at the closed end of the grid cage may, if desired, be welded to one another. The grid may be housed in a conventional manner in a discharge tube.

It has been found that the method according to the invention provides a great economy in time and work.

Although a particular embodiment of the die, matrix and grid support is described above, other embodiments are possible within the scope of the invention. The grid support for example may be shaped in the form of a cylinder with a flange and the like, while the matrix may be made of one piece, in which the grooves are provided in the top surface.

What is claimed is:

1. A method of manufacturing a cage-like grid member adapted for use in an electric discharge device, comprising providing a wire supporting member having an opening therein, positioning two groups of parallel, straight wires on one side of said wire supporting member such that the wires extend over the opening and the groups of wires cross one another, mounting a grid support member on the opposite side of the wire supporting member with an opening in the former substantially aligned with the opening in the latter, urging the crossed wires down through the opening in the wire supporting member and down through the opening in the grid support member until a predetermined depth is reached, and then securing the grid support member to the ends of the wires adjacent thereto to produce the cage-like grid desired.

2. A method of manufacturing a cage-like grid member adapted for use in an electric discharge tube, comprising providing a matrix support member having two groups of substantially right-angle positioned grooves therein surrounding a central opening, placing a plurality of wires of predetermined length in said grooves whereby said wires pass over said opening and said two groups of wires cross one another, providing a die member having grooves above the wires and a spring-biased counter-die member below the wires and adjacent thereto, mounting a grid support member having a central opening on the same side of said matrix as said counter-die with the opening therein surrounding the latter and aligned with the matrix opening, urging said die downward against the crossed wires through the opening in the matrix and against the counter-die and so that the crossed wires become U-shaped and the die, crossed wires, and counter-die pass through the grid support opening until the ends of the wires lie adjacent the grid support member, and thereafter securing the ends of the grid wires to the support member to form the cage-like grid.

3. Apparatus for manufacturing a cage-like grid adapted for use in an electric discharge tube, comprising a matrix support member having a plurality of grooves on an upper surface thereof surrounding a central opening, means for removably mounting a grid support member below and on said matrix and aligned with the matrix opening, a spring-biased counter-die aligned with the matrix opening and extending therein, and a die member having grooves along a surface thereof matched to the grooves on the matrix surface and adapted to pass through the opening in the matrix to engage the counter-die, the grooves on the matrix surface forming two groups at right angles to one another, the grooves in each group being substantially parallel to one another.

References Cited in the file of this patent
UNITED STATES PATENTS

| | | |
|---|---|---|
| 1,957,223 | Murphy | May 1, 1934 |
| 2,061,759 | Eitel | Nov. 24, 1936 |
| 2,385,973 | Eitel | Oct. 2, 1945 |
| 2,648,797 | Werner | Aug. 11, 1953 |
| 2,654,401 | Legendre | Oct. 6, 1953 |
| 2,661,029 | Walsh | Dec. 1, 1953 |